Patented Apr. 7, 1936

2,036,271

UNITED STATES PATENT OFFICE 2,036,271

CELLULOSE ACETATE COMPOSITIONS

Frederick C. Hahn, Wilmington, Del., assignor to E. I. du Pont de Nemours & Company, Wilmington, Del., a corporation of Delaware No Drawing. Application August 15, 1934, Serial No. 739,889. In Great Britain July 27, 1928

10 Claims. (Cl. 106—40)

This invention relates to cellulose acetate compositions, and more particularly to plastic and coating compositions comprising cellulose acetate and polyhydric alcohol esters of aromatic acids.

This case is a continuation in part of copending application Serial No. 295,856, filed July 27, 1928.

The quick-drying coating compositions, often referred to as lacquers, now on the market are composed of cellulose nitrate, one or more resins, one or more softeners and a solvent. For various reasons, it is often desirable to use cellulose acetate as the base for such coating compositions, but none of the ordinary natural resins are compatible with cellulose acetate, and hence it is not possible to make these compositions by simple substitution of cellulose acetate for cellulose nitrate. It is likewise often desirable to prepare plastic compositions containing cellulose acetate and a resinous or balsamic material. The natural resinous materials being incompatible cannot readily be employed with cellulose acetate in these plastic compositions.

This invention has as an object the provision of cellulose acetate compositions comprising resinous and/or balsamic reaction products of polyhydric alcohols with aromatic keto acids. Other objects will appear hereinafter.

These objects are accomplished by the following invention wherein polyhydric alcohol esters of aromatic keto acids, which esters may be prepared by reacting the polyhydric alcohol with the keto acid with or without a catalyst and/or a solvent, or by equivalent methods, are incorporated with cellulose acetate to form compositions useful in plastics, coating compositions, and the like.

It has been found that aromatic keto acid esters of the class above described can be prepared by reacting the appropriate aromatic keto acid, preferably an aroyl benzoic acid, with a polyhydric alcohol at a temperature sufficiently high to expel the water produced in the reaction as it is formed, or by using a catalyst such as sulfuric, hydrochloric, or aromatic sulfonic acids, and/or a solvent such as toluene, chloroform, carbon tetrachloride, or ethylene dichloride to aid in the removal of water. The esters may likewise be prepared by the general conventional methods such as the reaction of the acid chloride with the alcohol, reaction of a salt with the halide ester of the alcohol, and the like.

Having outlined above the general principles and purposes of the invention, the following specific exemplifications thereof are given in illustration but not in limitation.

*Example 1.—Glycerol benzoylbenzoate*

A mixture containing 1 mol glycerine, 3 mols benzoylbenzoic acid was heated at 200°–220° C. for 11 hours during which time the water of esterification was allowed to escape from the reaction mass. The resulting product had a low acid number and was found to be quite compatible with cellulose acetate.

*Example 2.—Diethylene glycol benzoylbenzoate*

A mixture containing 450 g. benzoylbenzoic acid, 106 g. diethylene glycol, 200 g. ethylene dichloride, and 400 g. sulfuric acid was heated to boiling in an apparatus designed to separate the water from the distillate and return ethylene dichloride to the reaction flask. Distillation was continued until the theoretical amount of water had been removed. The resulting product was washed with sodium carbonate solution to remove excess acid and then refined by heating to 150° C. at 50 mm. vacuum to remove volatile material. The remaining product was treated with decolorizing carbon and filtered, yielding a light colored highly viscous oil.

*Example 3*

A mixture of substantially 3 mols of monoethylin with 6 mols of benzoylbenzoic acid was heated at 175°–250° C. for 3–14 hours. The resulting products had a low acid number and was found to be quite compatible with cellulose acetate.

Other polyhydric alcohols which may be used in place of the glycerol, diethylene glycol, and monoethylin of Examples 1, 2, and 3 are: ethylene glycol, propylene glycol, polyethylene glycols, polypropylene glycols, etc. polyglycerol, sorbitol, pentaerythritol, monomethylin, monopropylin, monobutylin, monobenzylin, and other monoalkyl, monoaryl, or monoaralkyl, ethers of glycerine, etc. Aroyl benzoic acids are in general applicable. Thus, the benzoylbenzoic acid of the above examples may be replaced by toluylbenzoic, chlorobenzoylbenzoic, phenylbenzoylbenzoic, naphthoylbenzoic, etc.

Typical coating compositions containing these new materials are given in the following examples:

*Example 4*

| | Parts |
|---|---|
| Cellulose acetate | 12 |
| Glycerol benzoylbenzoate | 3 |
| Diethyl phthalate | 6 |
| Solvent | 179 |

*Example 5*

| | Parts |
|---|---|
| Cellulose acetate | 12 |
| Monoethylin benzoylbenzoate | 3 |
| Triacetin | 6 |
| Solvent | 179 |

Example 6

| | Parts |
|---|---|
| Cellulose acetate | 4 |
| Glyceryl benzoylbenzoate resin | 1 |
| Dibutyl tartrate | 2 |
| Diacetone alcohol | 2 |
| Acetone | 40 |

It is to be understood that a wide variety of solvents may be used in forming coating compositions of the type set forth above, but one solvent which has been found to be highly satisfactory, consists of acetone 17%, ethyl acetate 10%, ethyl alcohol 8%, toluene 20%, methoxyethanol 22%, acetone oils (boiling range 90°–150° C.) 20%, diacetone alcohol 3%.

Typical plastic compositions containing these esters are given in the following examples:

Example 7

| | Parts |
|---|---|
| Cellulose acetate | 100 |
| Diethylene glycol benzoylbenzoate | 60 |

Example 8

| | Parts |
|---|---|
| Cellulose acetate | 100 |
| Monoethylin benzoylbenzoate | 40 |
| Methoxyethyl phthalate | 40 |

The above plastic compositions may be prepared with or without the usual volatile solvents, that is, alcohol, acetone, or mixtures of toluolalcohol, etc. It is to be understood that other modifying agents than those mentioned may be added to the above compositions including other cellulose derivatives, natural resins, synthetic resins, oils and pigments. It is further to be understood that any part of the esters in the above compositions may be replaced by other compounds covered by this invention or by one or more of the more common resins or plasticizers generally used.

In order to more fully set forth the nature of the compounds to be covered by this invention, the following formula is given:

wherein R is the radical derived from the polyhydric alcohols, $R_1$ is a bivalent aromatic radical, $R_2$ is a monovalent aromatic radical, and $x$ is two or more depending on the nature of the polyhydric alcohol. $R_1$ and $R_2$ may be substituted and the substituent group may be hydrocarbon, halogen, or hydroxyl groups.

It is to be understood that the derivatives covered by this invention may be used in proportions other than those disclosed in the above example. In fact they may be used in any proportion varying from 10% to 150% based on the weight of the cellulose acetate.

The derivatives covered by this invention may be used in the preparation of all types of compositions containing cellulose acetate and various modifiers. Specifically they may be used in the preparation of lacquers or enamels for coating metal, wood or paper, dopes for coating fabrics, in plastic compositions to be used in the preparation of the toilet ware, novelties, sheeting rods, tubes, safety glass interlayers, etc., and lacquer for coating wire screen or in the preparation of transparent sheets for wrapping purposes.

This invention is highly advantageous in that it discloses resinous or balsamic materials which are highly compatible with cellulose acetate. This is not in general true of polyhydric alcohol esters. Thus, it is a well-known fact that glycerol phthalate is incompatible in cellulose acetate compositions. Glycerol salicylate prepared according to the disclosure of French Patent 361,544 by heating 31 parts of glycerol and 138 parts of salicylic acid at 160° C. for 14½ hours at a pressure of 30 mm. followed by solution in benzene and washing with aqueous sodium carbonate solution, which purified glycerol salicylate had a saponification value of 342.5, when formulated into a lacquer with cellulose acetate in which lacquer the ratio of cellulose acetate to ester was 1:1, gave films which on drying were cloudy, indicating incompatible films. Films having the desired characteristics of clarity and homogeneity could be obtained only when the films were dried under special conditions.

Glycerol benzoate prepared by heating 92 parts of glycerol with 366 parts of benzoic acid at 200°–290° C. for 7 hours was a crystalline material which when formulated into lacquers in the ratio of 1 part cellulose acetate to 1 part glycerol benzoate gave incompatible films either when dried at room temperature under normal atmospheric conditions or when dried in a 65° C. oven.

The resins of the present invention on the other hand are perfectly compatible in either plastic or coating compositions with cellulose acetate in a 1:1 ratio or greater or smaller amounts.

The above description and examples are intended to be illustrative only. Any modification of or variation therefrom which conforms to the spirit of the invention is intended to be included within the scope of the claims.

I claim:

1. A composition comprising cellulose acetate and, in such relative proportion as to form a coating or molding composition, a polyhydric alcohol ester wherein each acid component is an aroyl benzoic acid.

2. A composition comprising cellulose acetate and 10–150% by weight of the cellulose acetate, of a polyhydric alcohol ester wherein each acid component is an aroyl benzoic acid.

3. A composition comprising cellulose acetate and 10–150% by weight of the cellulose acetate, of a glycerol ester wherein each acid component is an aroyl benzoic acid.

4. A composition comprising cellulose acetate and 10–150% by weight of the cellulose acetate, of a polyhydric alcohol ester wherein each acid component is a benzoylbenzoic acid.

5. A composition comprising cellulose acetate and 10–150% by weight of the cellulose acetate, of a glycerol ester wherein each acid component is a benzoylbenzoic acid.

6. A composition comprising cellulose acetate and 10–150% by weight of the cellulose acetate, of glyceryl o-benzoylbenzoate.

7. A composition comprising cellulose acetate, 10–150%, based on the weight of the cellulose acetate, of glyceryl o-benzoylbenzoate, and a solvent.

8. A composition comprising cellulose acetate, 10–150%, based on the weight of the cellulose acetate, of glyceryl o-benzoylbenzoate, a softener, and a solvent.

9. A composition comprising cellulose acetate, 10–150%, based on the weight of the cellulose acetate, of glyceryl benzoylbenzoate, diethyl phthalate, and a solvent.

10. A composition comprising 4 parts of cellulose acetate, 1 part glyceryl benzoylbenzoate, 2 parts dibutyl tartrate, 4 parts diacetone alcohol, and 40 parts of acetone.

FREDERICK C. HAHN.